(12) United States Patent
Heinonen et al.

(10) Patent No.: US 6,816,719 B1
(45) Date of Patent: Nov. 9, 2004

(54) METHOD AND SYSTEM FOR MAKING WIRELESS TERMINAL PROFILE INFORMATION ACCESSIBLE TO A NETWORK

(75) Inventors: Eeva-Liisa Heinonen, Tampere (FI); Jaakko Itävaara, Kirkkonummi (FI); Heidi Karves, Tampere (FI); Kai Kronström, Tampere (FI); Kari Lehtinen, Tampere (FI); Jari Mononen, Ruutanan (FI); Petri Nykänen, Tampere (FI); Mikko Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/432,963

(22) Filed: Nov. 3, 1999

(51) Int. Cl.[7] .................................................. H04Q 7/20
(52) U.S. Cl. ..................... 455/403; 455/433; 455/435.1
(58) Field of Search .............................. 455/403, 404.2, 455/405, 414.1, 414.2, 413, 426.1, 426.2, 95, 575, 463, 466, 552.1, 554.1, 555, 556.1, 556.2, 557, 461, 435.1, 432.3, 433

(56) References Cited

U.S. PATENT DOCUMENTS

| | | | | |
|---|---|---|---|---|
| 5,742,905 A | * | 4/1998 | Pepe et al. ................. | 455/461 |
| 5,802,466 A | * | 9/1998 | Gallant et al. .............. | 455/413 |
| 5,844,979 A | * | 12/1998 | Raniere et al. ............. | 379/202 |
| 5,940,082 A | * | 8/1999 | Brinegar et al. ............ | 345/442 |
| 6,122,514 A | * | 9/2000 | Spaur et al. ................. | 455/448 |
| 6,229,810 B1 | * | 5/2001 | Gerszberg et al. .......... | 370/401 |
| 6,496,575 B1 | * | 12/2002 | Vasell et al. ........... | 379/102.05 |

FOREIGN PATENT DOCUMENTS

| | | |
|---|---|---|
| EP | 0519838 | 12/1992 |
| EP | 0611070 | 8/1994 |
| EP | 0781067 | 6/1997 |
| EP | 0865188 | 9/1998 |
| WO | 9747121 | 12/1997 |

* cited by examiner

*Primary Examiner*—Tony T. Nguyen
(74) *Attorney, Agent, or Firm*—Antonelli, Terry, Stout & Kraus, LLP

(57) ABSTRACT

A method and system for making profile information of a plurality of users of wireless terminals in a network accessible to the network. A current operational mode of the wireless terminal is determined. The current operational mode is identified by an operational mode name. The wireless terminal identification is used to identify the wireless terminal and/or a user of the wireless terminal. Profile information of the wireless terminal is sent to the network where the profile information includes the operational mode name and the wireless terminal and/or user identification. The profile information is sent by the wireless terminal and the sent profile information is accessible from the network.

30 Claims, 6 Drawing Sheets

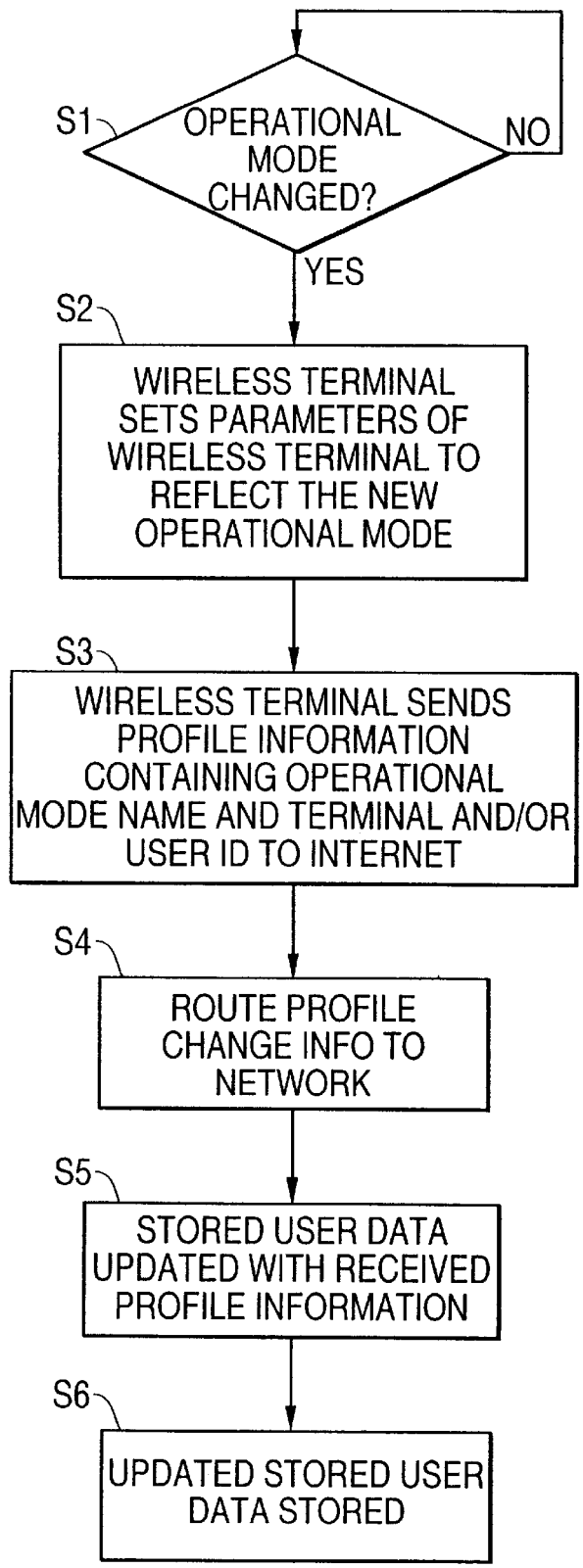

FIG. 5

COMPANY WHITEBOARD  OCTOBER 10, 1999 12:59

| NAME | USER-NAME | ACTIVE OPERA-TIONAL MODE | LATEST OPERATIONAL MODE CHANGE | CAMPUS (ACCESS POINT) | PRESET OPERA-TIONAL MODE | PRESET NEW OPERATIONAL MODE | TALKING |
|---|---|---|---|---|---|---|---|
| JOHN DOE | JDOE | MEETING | 12:45 | CAMPUS1 | - | - | |
| JANE DOE | JADOE | NORMAL | 08:00 | CAMPUS2 | - | - | X |
| MARY HIGGINS | MHIGGIN | NORMAL | 10:00 | CAMPUS1 | 13:00 | MEETING | |
| MIKE MONROE | MMONROE | OUTDOORS | - | - | 14:00 | MEETING | - |
| JOSEPH SMITH | JSMITH | HOLIDAY | 10.10.1999 | - | 23.10.1999 | NORMAL | - |
| MIKE THATCHER | MTHATCH | NORMAL | 13:45 | FACTORY1 | - | - | X |

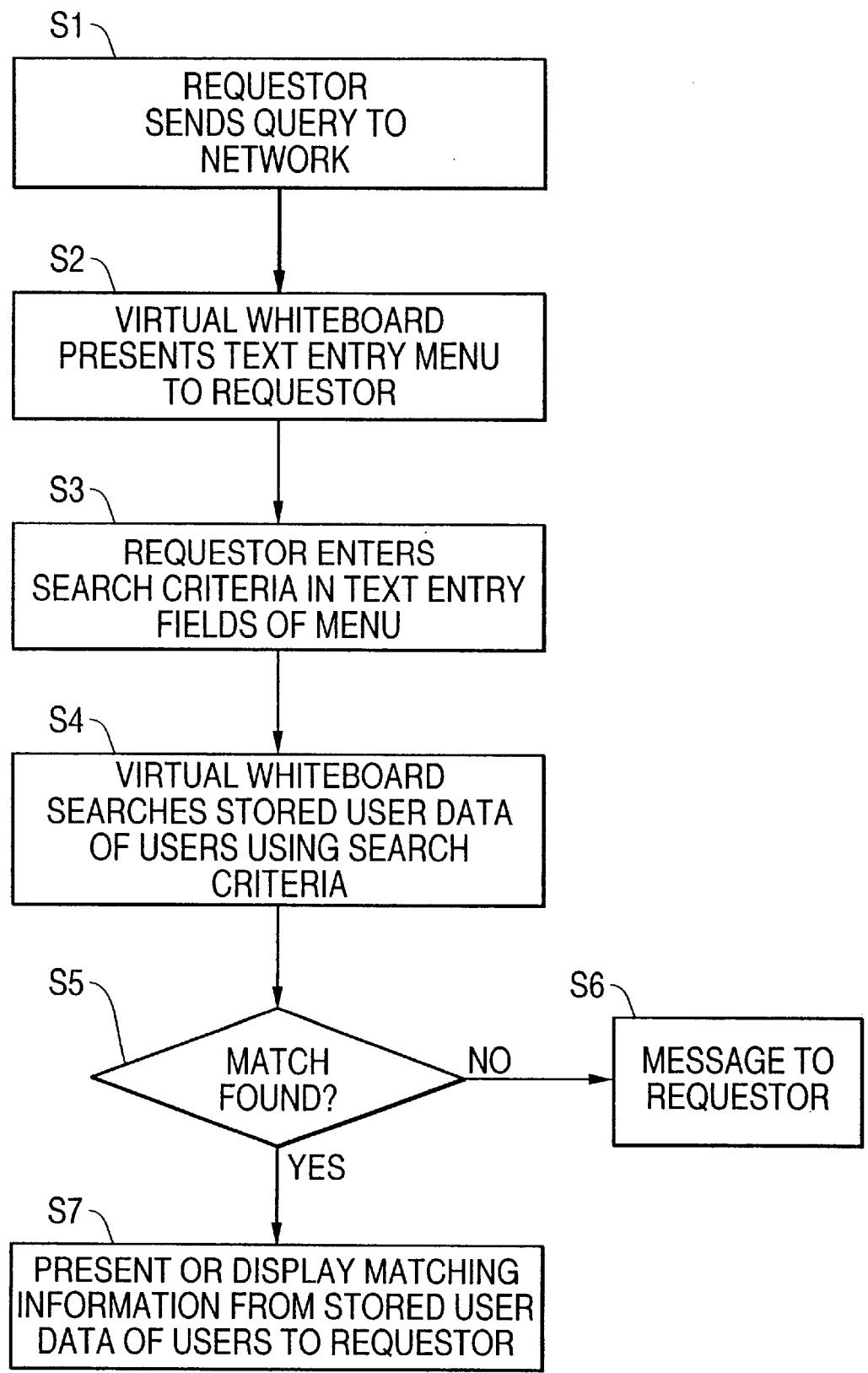

METHOD AND SYSTEM FOR MAKING WIRELESS TERMINAL PROFILE INFORMATION ACCESSIBLE TO A NETWORK

BACKGROUND OF THE INVENTION

1. Field of the Invention

This invention relates to terminal profile information, and more specifically to a method and system for making wireless terminal profile information accessible to a network.

2. Background and Material Information

In an office environment, knowing where people are and what they are doing is very useful. Currently, in many companies, a whiteboard where employees can write down their availability is used. This information is very useful to help people reach each other at the company.

In today's society many people are on the move, and cannot always be found in the office sitting at a desk. Many of these type employees carry mobile/portable devices with them. These mobile devices may have operational modes that can be set by the users to control settings of the mobile device and/or denote a status of the user.

The operational mode defines parameters of the wireless terminal and may have names such as "meeting", "outdoors", etc. If the wireless terminal is a wireless phone, for example, the operational mode may define parameters such as ringing tone, volume, lights, etc. If the operational mode of the wireless phone was set to "meeting", the wireless phone parameters would then be automatically defined. The parameters for "meeting" may be set as, for example, ringing tone=off, volume=mute, lights=off, etc. If the operational mode of the wireless phone was set to "outdoors", the parameters may be set differently. For example, ringing tone=fast beep, volume=high, lights=bright, etc. The operational mode, defines parameters of the wireless device.

The user of a mobile device may be identified, for example, from the information stored on the SIM-card (Subscriber Identity Module) or by connecting the device identification to a specific user in the network. The mobile device can usually be identified, depending on the network environment. For example, in the GSM (Groupe Speciale Mobile, i.e., Global System for Mobile Communications) network this can be done with an IMEI (International Mobile Equipment Identity) code.

The GSM numbering system is a 15 digit unique code that is used to identify the GSM/DCS (Digital Cellular System)/PCS (Personal Communications Service) phone to a GSM/DCS/PCS network. When a phone is switched on, this unique IMEI number is transmitted and checked against a data base of blacklisted or greylisted phones in the network's EIR (Equipment ID Register). This EIR determines whether the phone can log onto the network to make and receive calls.

Users may set a particular operational mode, or the operational mode may be set automatically based on the current situation of the user. For example, a user may be currently in a meeting and, therefore, sets the operational mode in his or her wireless device to "meeting". Once the meeting is over, the user may change his or her operational mode to "general" or "normal". This information may be used to express the user's presence or current status to other people. By putting the wireless terminal in a specific operational mode, several settings or parameters for the wireless terminal associated with this operational mode are automatically set. This avoids having to set each individual parameter separately.

EP 0 611 070 discloses a portable phone whose phone settings are stored in groups (modes) so that the user, when switching from one group to another, can switch several settings at a time. A single operation by the user may set the ringing strength, loudspeaker volume, display light, etc. FIG. 3 of EP 0 611 070 shows the relationship between operating characteristics (e.g., sound volume, ringing tone, lights, etc.) and defined groups (e.g., indoors, outdoors, conference, etc.). This information is only available to the user.

EP 0 865 188 discloses portable phones that may have various modes or profiles that can be selected manually, or automatically in response to the phone's surroundings based on a sensed control parameter. The profiles are located in the portable phone, and each profile may define multiple settings for the phone or user. However, this information is only available to the user.

DECT-phones (Digital European Cordless Telecommunication) generally have a system where the user can program desired information in the phone. This information is available to the telephone exchange, and a caller when calling the user. The information is only presented to the caller, and only when calling the user. Other methods of keeping track of the current status of employees or others include: using a physical whiteboard on a wall of the office, having a particular person, such as a secretary, always be aware of peoples' movements and status, or pure word of mouth speculation.

However, these methods have several problems associated with them. The DECT systems show information of the user only when the person calls the user. Also, people do not always update their information on whiteboards, or the information they give is false information. When information is passed to a particular person, many times the information is not moved fast enough to be useful (i.e., the information is old and not current), or doesn't move at all. In addition, the information, when it is stored somewhere, is not easily available to other people.

SUMMARY OF THE INVENTION

Accordingly, the present invention is directed to a method and system for making some wireless terminal profile information accessible to a network that substantially obviates one or more of the problems arising from the limitations and disadvantages of the related art.

One aspect of the present invention is directed to a method for making some profile information of a wireless terminal in a network accessible to the network that includes: determining a current operational mode of the wireless terminal where the current operational mode is identified by an operational mode name; determining a wireless terminal identification for the wireless terminal; and sending profile information of the wireless terminal to the network where the profile information includes the operational mode name and the wireless terminal identification and/or user identification, the profile information may be sent by the wireless terminal and the sent profile information may be accessible from the network.

The wireless terminal identification may be used to identify the wireless terminal and/or a user of the wireless terminal. The profile information may be used to update stored user data. The stored user data may include user identification, wireless terminal information, and operational mode name. The stored user data may be stored on the network. The profile information may be sent automatically to the network when the operational mode has changed. The sent profile information may be stored on the network.

The storing may be performed by a network application. The network application may be a virtual whiteboard application having access to the network. The profile information or user data stored by the virtual whiteboard application may be accessible and viewable from a virtual whiteboard. The virtual whiteboard may be accessible and viewable by each user. The virtual whiteboard may be accessible and viewable by people other than users. A parameter in the current operational mode may be settable that prohibits the profile information stored on the network application from being accessed and/or viewed.

The network may be a Wireless Local Area Network (WLAN). The profile information may be stored in a database. The wireless terminal may communicate with the network using a transport interface. The transport interface may be a Wireless Application Protocol (WAP) interface. The transport interface may be a TCP/IP (Transmission Control Protocol/Internet Protocol) interface. The transport interface may be a Short Message Service (SMS) interface. The transport interface may be an E-mail interface. The wireless terminal may use the Internet to send the profile information to the network. The stored user data may be searched for desired information using search criteria.

An aspect of the present invention is directed to a system for making profile information of a wireless terminal in a network accessible to the network that includes: a network; a plurality of wireless terminals where at least one of the plurality of wireless terminals may be associated with one of a plurality of users and the plurality of wireless terminals are operably connected to the network; at least one transport interface where the at least one transport interface allows communication between the plurality of wireless terminals and the network and the plurality of wireless terminals sends profile information of each associated plurality of wireless terminals to the network using the transport interface; and a network application where the network application receives and stores the profile information for each plurality of wireless terminals and the stored profile information or user data may be accessible from the network.

The plurality of wireless terminals may include wireless phones, portable computers, Smart Phones, and/or wireless Personal Communicators. The network application may store the profile information in a database. The network application may include a user interface. The user interface may be a graphical user interface.

The transport interface may be a Wireless Application Protocol (WAP) interface. The transport interface may be a TCP/IP (Transmission Control Protocol/Internet Protocol) interface. The transport interface may be a Short Message Service (SMS) interface. The transport interface may be an E-mail interface.

The network may be a Wireless Local Area Network (WLAN). The plurality of wireless terminals may be connected to the WLAN through access points connected to the WLAN. The network may be accessible to the wireless terminals using the Internet.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein:

FIG. 4 is a flowchart of an exemplary process of a network being sent profile information of a user of a wireless terminal that is outside the range of an access terminal according to the present invention;

FIG. 5 is a diagram of an exemplary virtual whiteboard according to the present invention; and FIG. 6 is a flowchart of an exemplary process where a person enters search criteria into a menu to access user data stored on a network.

DETAILED DESCRIPTION OF THE PREFERRED EMBODIMENTS

Figure 1:
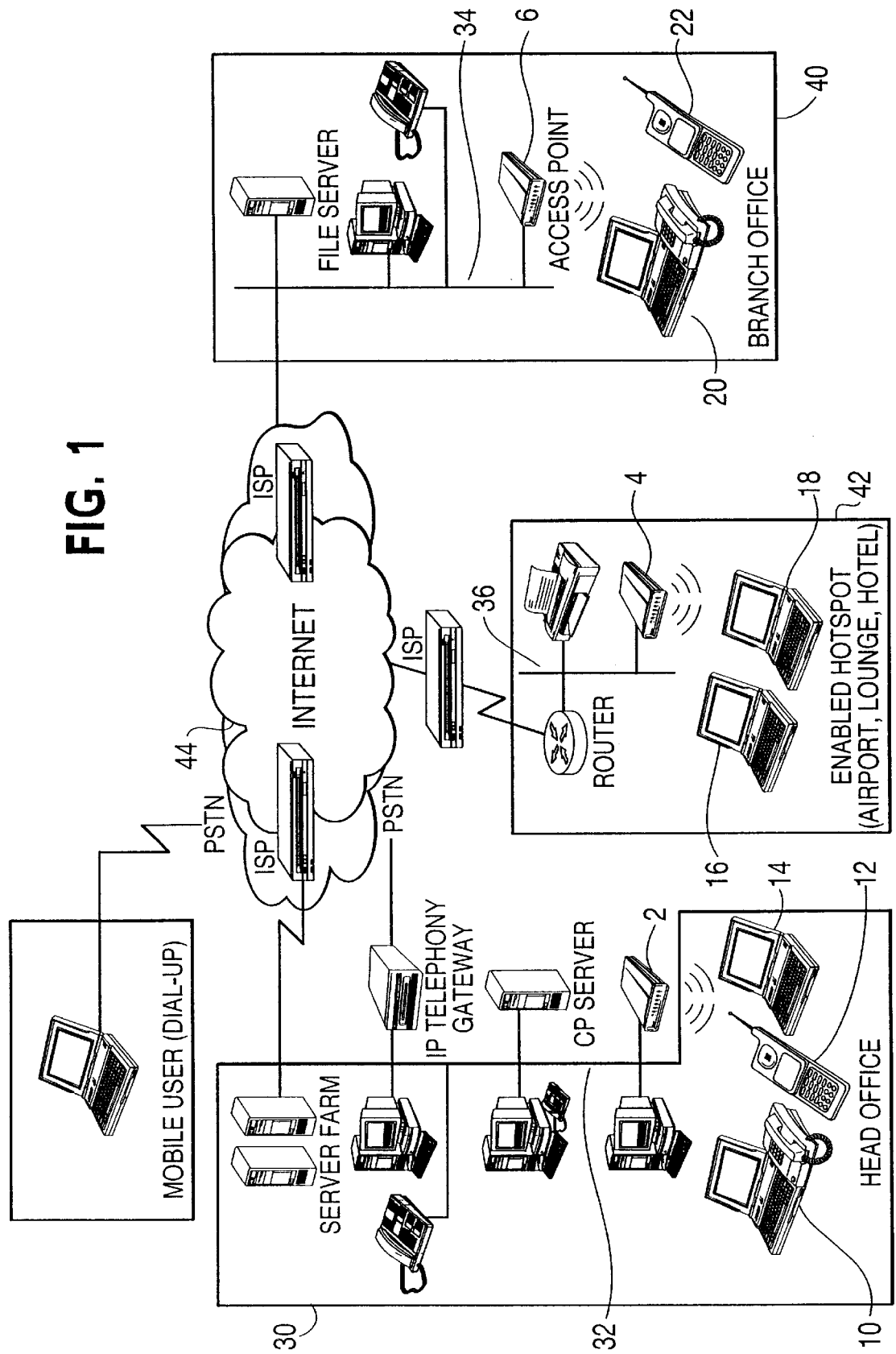
FIG. 1 is a system diagram of exemplary networks according to the present invention.

The particulars shown herein are by way of example and for purposes of illustrative discussion of the embodiments of the present invention only and are presented with the cause of providing a useful and readily understood description of the principles and conceptual aspects of the present invention. In this regard, an attempt is made to show structural details of the present invention in enough detail for the fundamental understanding of the present invention. The description taken with the drawings make it apparent to those skilled in the art how the several forms of the present invention may be embodied in practice.

The present invention allows easy access of current information from stored user data of users of wireless terminals to other people or applications by making the current information accessible and/or viewable from a network. Profile information is sent to a network from a wireless terminal of a user. The profile information sent to the network includes the name of the operational mode of the wireless terminal and identification information regarding the wireless terminal and/or user. Given the wireless terminal identification, the identity of the user may be known since the wireless terminal may be associated with a particular user. Once received by the network, the profile information may be used to update the stored user data. The stored user data may contain the profile information and other information, for example, more detailed information regarding the user (e.g., home address), the access point to the network of the wireless terminal, etc. The profile information received by the network, or the entire stored user data may be made accessible to people or applications having access to the network. A network application may facilitate receiving and making accessible the information related to the stored user data. The network application may include a user interface, e.g., a graphical user interface. The network application may also include a menu system that has search criteria input fields.

The stored user data may be transmitted to a requester by a network application, such as a virtual whiteboard application that controls a virtual whiteboard, or made available by the network application for the requester to access and/or view. This may be in the form of a virtual whiteboard.

Unlike conventional whiteboards, that are usually physical structures that are updated by writing the information on the whiteboard with some form of writing device, a virtual whiteboard, or virtual board, is an electronic whiteboard that has access to information stored somewhere accessible from the network. The virtual whiteboard may be directly connected to the network, or not directly connected to the network but accessible from the network (e.g., on the Internet). If the operational mode is changed by a user or automatically changed, the wireless terminal of that user sends the profile information (i.e., operational mode name and wireless terminal identification and/or user identification) to the network to update the stored user data. The virtual whiteboard application may receive the profile information and update the stored user data. Therefore, in the present invention, the information in the stored user data is updated automatically with changed profile information, and the stored user data is always up-to-date. A person accessing the network may access and/or view information in stored user data from a single user, all users, or a defined subset of users.

One exemplary embodiment that will be used to illustrate the present invention is an embodiment where the network is a Wireless Local Area Network (WLAN). An exemplary method used for presenting the updated stored user data is by using a virtual whiteboard that is managed by a virtual whiteboard application that has access to the stored user data. However, this invention includes making information in stored user data of wireless terminals accessible to any type of network, and using other types of network applications.

FIG. 1 is a diagram of exemplary networks according to the present invention. These exemplary networks are WLANs. WLAN access points 2, 4, 6 provide wireless access to WLANs 32, 34, 36 respectively for wireless terminals. Wireless terminals 10, 12, 14 are connected to WLAN 32 through access point 2. Wireless terminals 20, 22 are connected to WLAN 34 through access point 6. Wireless terminals 16, 18 are connected to WLAN 36 through access point 4.

Wireless terminals 10, 12, 14, 16, 18, 20, 22 may be any wireless device used for communication, e.g., wireless telephone, Smart Phone, Personal Communicator (e.g., PDA), or portable computer. If a terminal is outside of the network coverage area of the access points on the WLAN, the terminal does not have access to the WLAN. Although in this exemplary system, only one access point is shown per WLAN, each WLAN may have multiple access points that connect wireless terminals to the WLAN.

WLAN 32 may be located in the head office building of a company. Other company buildings in different geographic areas, such as branch office 40, may have their own WLAN 34. The access points may be located in convenient locations in or outside these buildings and allow wireless terminals to be connected to the WLAN. The access points have a limited range within which a wireless terminal must be in order to be connected to the WLAN. However, other buildings 42 that are not used by a company, such as airports, hotels, etc., may have one or more access points 4 that allow wireless terminals access to a WLAN 36 that has the ability through some other method of communicating with other WLANs.

The WLAN may have a connection to the Internet 44 allowing communication between devices on the WLAN, including the wireless terminals, to the Internet 44. Also, communication may occur between WLANs of a company that are located in different buildings in different geographic areas by using connections to the Internet. For example, wireless terminal 12 connected to WLAN 32 in the head office building 30 may communicate through access point 2 to WLAN 32, to the Internet 44, and then to WLAN 34 located in branch office building 40 in a different geographic area. The communication may be voice over IP (Internet Protocol) where voice signals from the wireless terminal are transferred using the Internet and not the normal telephone wire lines.

Each user of a wireless terminal has at least one associated stored user data that contains information regarding the operational mode of the wireless terminal, terminal identification, and/or information regarding the user. Table 1 contains some exemplary information that may be contained in the stored user data whose wireless terminal is a wireless phone. Other information may also be included in the stored user data, or some not shown in Table 1, and still be within the spirit and scope of the present invention. The stored user data contains one or more parameters that give information regarding the operational mode of the wireless terminal and/or user. The parameter "WLAN terminal mode" contains the name of the current operational mode which may define the status, or activity of the user. This is likely the most useful information to others accessing information from the stored user data. The name of the operational mode along with identification information identifying the wireless terminal and/or the user, are the key pieces of information send to the network from the wireless terminal. More detailed information about the user (e.g., address, home phone number, etc.), may also be retrieved from storage, based on the terminal or user identification, and displayed by the virtual whiteboard if desired. The additional parameters are self explanatory from the text in Table 1.

TABLE 1

| PARAMETER | DESCRIPTION |
| --- | --- |
| User name | Name of the person with wireless terminal, and possibly other information such as picture, phone number, etc. |
| WLAN operational mode | The name of the current operational mode of the wireless terminal and/or user. This defines a set of parameters for the wireless terminal, and may be set by the user or automatically. |
| Latest change in stored user data | The date/time the stored user data was last modified. |
| Access point | The access point that connects the wireless terminal to the WLAN. |
| Preset operational mode name change | The date/time the terminal operational mode is set to change automatically. |
| Preset operational mode name | The new terminal operational mode setting after the preset operational mode name change date/time. |
| In/out of network coverage | Conveys whether the user is in or out of network coverage. |
| Talking | Conveys that the user is carrying on a phone conversation. |
| Terminal ID | Identification information that identifies the terminal and/or user of the terminal. |
| Not cooperating | If active, prohibits the stored user data from being available for others. |

Figure 2:
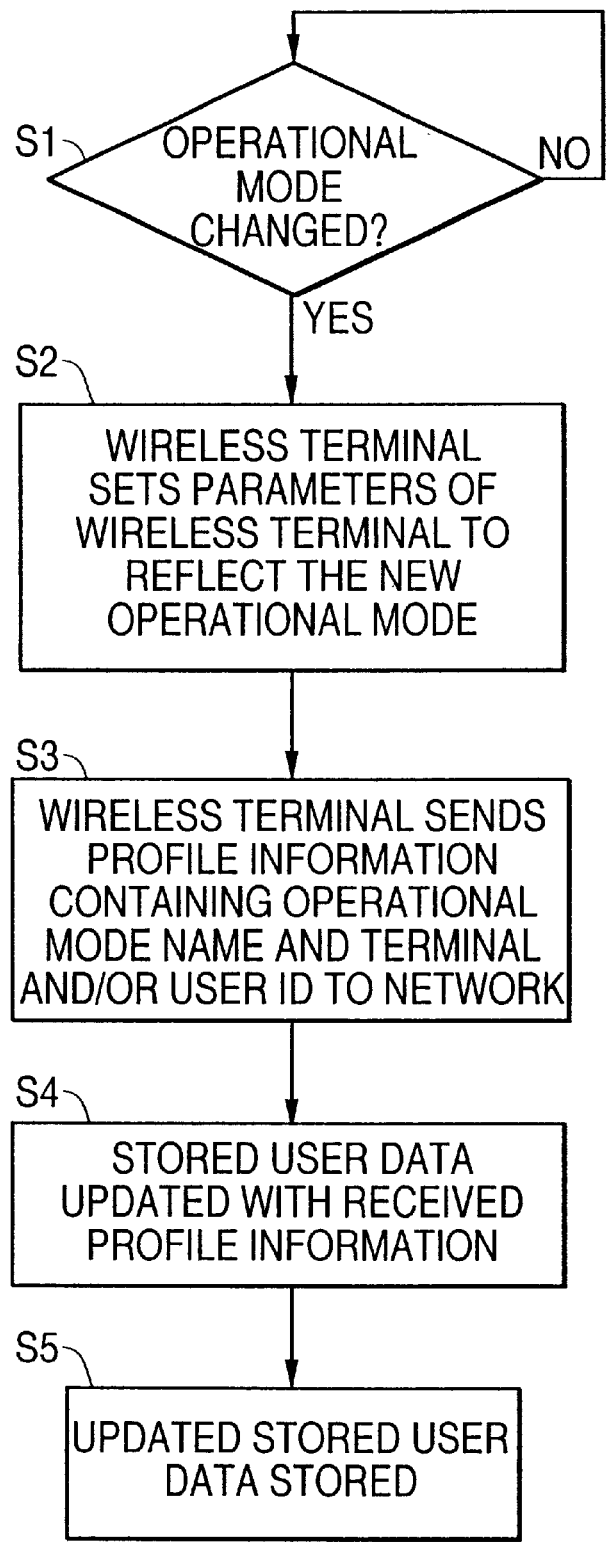
FIG. 2 is a flowchart of an exemplary process of a wireless terminal of a user sending profile information to a network according to the present invention.

FIG. 2 is a flowchart of an exemplary process of a wireless terminal of a user sending profile information to a network according to the present invention. The operational mode 15 of the wireless terminal may set denoting the current status or situation of the user. If the user now is in a different situation, the operational mode of the wireless terminal of the user may be changed (S1). The wireless terminal then notes that the operational mode has been changed, and sets the parameters of the wireless terminal to reflect the new operational mode (S2). The wireless terminal then sends profile information containing the operational mode name and wireless terminal and/or user identification information to the network (S3). This may be by any of many methods, for example, SMS or USSD (in GSM world), R-data (in TDMA), TCP/IP (computer networks), or other transport interface (mentioned previously). The profile information is received by the network and the stored user data is updated with the received profile information (S4). The updated stored user data is then stored (S5).

A network application may perform the tasks of receiving the profile information, using it to update the stored user data, and storing the updated user data of the user, or these tasks may be performed directly by the wireless terminal or applications in the wireless terminal. The information in the user data may be stored in a database accessible from the network. Therefore, the information may be accessed by others. The network application and database may reside in any server on the network, or may reside on the Internet, or any other location accessible to the network. The network application may be a virtual whiteboard application that manages a virtual whiteboard used to allow access or viewing of the information from the stored user data.

Figure 3:
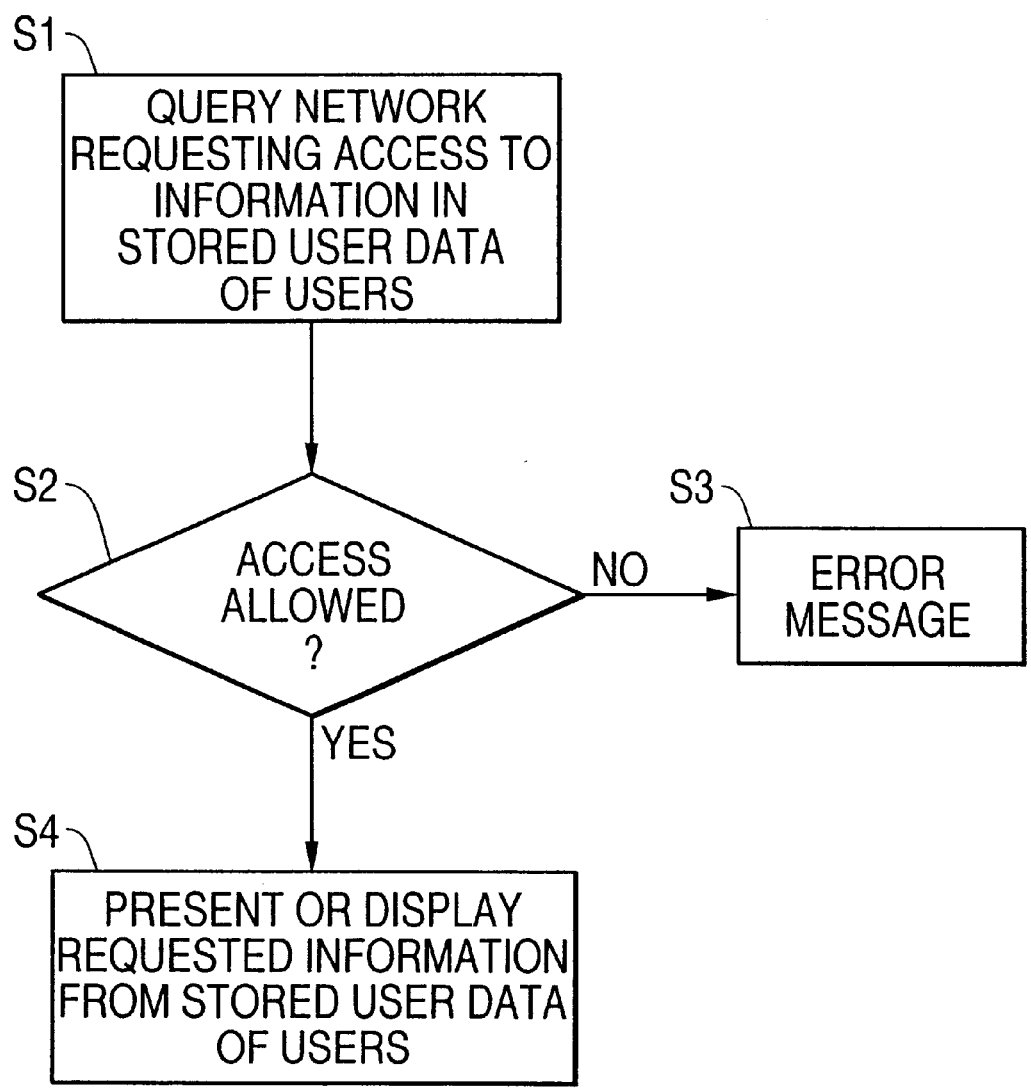
FIG. 3 is a flowchart of an exemplary process of accessing user data from a network according to the present invention.

FIG. 3 is a flowchart of an exemplary process of accessing information in the stored user data from a network according to the present invention. A second user, other people, or other applications that desire to check the information in the stored user data may access a virtual whiteboard (or similar network facility) to view the desired information. The person or application desiring access to the information in the user data contained in the database sends a query to the network requesting access to the information in one or more stored user data (S1). The virtual whiteboard application may confirm that the person or application is allowed access to the desired information in the stored user data (S2). If the person/application is not allowed access to the information, an error message is sent (S3). If the person/application is allowed to access the information, the virtual whiteboard then allows access to and/or presents the information from the stored user data (S4). This information may be queried and viewed from a wireless terminal of another user, from a person not using a wireless terminal, or from applications through any one of many channels. The information from the stored user data may be viewable on the Internet or company Intranet with an Internet browser or WAP (Wireless Application Protocol) browser, or the information may be queried by SMS (Short Message Service), or sent as E-mail. Therefore, the information may be viewed directly by accessing the network, or may be sent to a requesting person/application in response to a query for the information.

In the previous embodiment of the present invention, the profile information sent from wireless terminals to the network to update the stored user data is sent from the wireless terminals to the network. However, wireless terminals may send the profile information through any other method that allows access to the network. Wireless terminals that may be outside of the network coverage because they are outside of the range of an access terminal, may, however, have access to the Internet.

FIG. 4 is a flowchart of an exemplary process of a network being sent the profile information of a user of a wireless terminal that is outside the range of an access terminal according to the present invention. In this exemplary embodiment of the present invention, the wireless terminal may send the profile information to the network to update the stored user data using the Internet. The operational mode of the wireless terminal of the user is changed (S1). The wireless terminal then sets the parameters of the wireless terminal to reflect the new operational mode (S2). The wireless terminal then sends profile information containing the operational mode name and wireless terminal and/or user identification information to the Internet (S3). The wireless terminal may connect to the Internet through normal telephone lines, cable modem, or any other method. The message has appropriate destination information associated with it to cause the message to be routed from the Internet to the network (S4). The profile information is received by the network and the stored user data is updated using the received profile information (S5). The updated stored user data is then stored (S6). The network has a connection to the Internet to allow this type of communication. This connection may be by any of many known methods.

The network may have a transport interface that facilitates the communication between the network and people and/or devices sending the profile information and/or accessing information in the stored user data from the network. The transport interface may be any interface that supports this type of communication, such as a Wireless Application Protocol (WAP) interface, a TCP/IP (Transmission Control Protocol/Internet Protocol) interface, a Short Message Service (SMS) interface, or an E-mail interface.

The operational mode of a wireless terminal may be updated manually by the user, or automatically by a calendar or attached peripheral device. In some situations, the information in the stored user data may be updated automatically by a gatekeeper function attached to the network. The gatekeeper may monitor wireless terminals to track whether they are in or out of network coverage. If the gatekeeper finds that a wireless terminal is unreachable, the gatekeeper may automatically inform the network to update the information in the stored user data to communicate that the user is outside the network coverage. The gatekeeper may determine that the user is outside network coverage after searching for the wireless terminal in response to a query, or from regular monitoring of the availability of all wireless terminals.

The information in the stored user data may be updated, but the updated information not made available for accessing and/or viewing to others. One possible example of this would be if the user is at home. The user may change the operational mode (or the change automatically entered) in her wireless terminal to reflect that the user is unavailable and at home. The profile information containing the current operational mode name and terminal and/or user identification information is sent to the network for updating of the information in the stored user data. An administrator may exist who manages the stored user data (e.g., controls the virtual whiteboard application, virtual whiteboard, and/or database). The administrator may also control what and how information is displayed on the virtual whiteboard. The administrator may also control who may update the virtual whiteboard, and who may access the virtual whiteboard. This administrator may have access to the updated information in the user data, stored in the database, that communicates that the user is unavailable and at home, however, others may only be allowed to view from the virtual whiteboard that the user is unavailable. The information in the stored user data may have tags, flags, or other indicators that reflect whether the updated information is to be displayed on the virtual whiteboard and viewable by others, or not. Further, the operational mode may be set that contains parameters designating that the user is unreachable except for certain situations, e.g., emergencies, Client A calls, etc.

FIG. 5 is a diagram of an exemplary virtual whiteboard according to the present invention. The virtual whiteboard shows exemplary stored user data for six users. The first column contains the full name of the user, whereas the second column contains the user name as it is known to the network. The third column shows the current active operational mode of the wireless terminal of the user. The operational mode may generally tell the current activity or availability of the user. John Doe is currently in a meeting. Jane Doe, Mary Higgins, and Mike Thatcher have a 'Normal' setting suggesting that they are in the network coverage and can be contacted if needed. Mike Monroe is currently outdoors suggesting that he may be outside of the network coverage and/or unavailable, or may be available but in a noisy environment. The fourth column contains the date/time of the last change to the operational mode. The fifth column contains the access point that connects the user's wireless terminal to the network. The sixth column contains the next preset date/time the operational mode will be changed. The seventh column contains the new operational mode setting after the preset profile change date/time. Therefore, at 13:00 hours (one o'clock PM) the operational mode of Mary Higgins will automatically be changed from "Normal" to "Meeting". Similarly, on Oct. 10, 1999, the operational mode of Joseph Smith will automatically be changed from "Holiday" to "Normal". The last column displays whether the user is currently using the wireless terminal. In this exemplary embodiment the wireless terminal may be a telephone, however, the wireless terminal may be other devices, e.g., a computer, in which case the last column may denote that the wireless terminal is in use by the user and, therefore, the user is not currently accessible.

The virtual whiteboard may have a set display/access format where the same type of information from the stored user data is always displayed/accessed, and the information is always presented in the same format. For example, the virtual whiteboard may always display the information from the stored user data of all users, and the information displayed on the whiteboard may always include all the information for each user.

Moreover, the format and type of information in the user data displayed/accessed from the virtual whiteboard may be selectable by the person/application accessing the information. In this regard, a person/application desiring access to the information in the stored user data from the network may be presented with a menu from the virtual whiteboard application where the type of information, and/or the format desired for presentation, may be selectable by the person/application accessing the virtual whiteboard. This virtual whiteboard menu may also include the ability to search the database based on one or more criteria entered in the menu by the person/application accessing the virtual whiteboard.

A person/application accessing the network may want to view the information in the stored user data of only one wireless terminal user. This person/application may submit the name, or other identifying criteria, to the virtual whiteboard application menu search criteria field. The virtual whiteboard application would then search the database to find a match with the search criteria. If a match is found, the virtual whiteboard would then display/present the matching information for the wireless terminal user. However, a person accessing the network may want to view the information in the user data of all wireless terminal users.

This desire may be entered into the virtual whiteboard application menu, therefore, causing the virtual whiteboard to display/present the information from the user data of all wireless terminal users.

Information may also be entered into the menu requesting the virtual whiteboard to display/present only specific information. For example, a person accessing the network may desire to see the information in the stored user data of all users who have the operational mode in their stored user data set to 'vacation'. This may be advantageous if the person requesting the information wants to know what users are not available for a meeting that might be called. The virtual whiteboard application then searches the stored user data and displays/presents the information in the stored user data of all users that have 'vacation' entered as the current operational mode.

FIG. 6 is a flowchart of an exemplary process where a requestor (person or application) enters search criteria into a menu to access information in the stored user data stored on a network. A requestor sends a query to the network (S1). The virtual whiteboard application then presents the requestor with a menu which contains one or more text entry fields for the requester to enter search criteria (S2). The requester then enters search criteria based on specific information in the stored user data (S3). The search criteria is used by the virtual whiteboard application to search the information in the stored user data (S4). The virtual whiteboard application determines if any matches have been found (S5). If a match is found between the search criteria and the stored information, this matching information is presented to the requestor (S7). If a match is not found, an appropriate message conveying this is presented to the requestor (S6). Other information from the user data that contain matching information may also be presented/displayed.

The present invention may be used in a variety of useful ways. For example, sending profile information to a network may allow a company whiteboard to be used to view employee status/availability. Also, sending profile information to a network may allow a telephony system to use the profile information as an automatic call forward indicator, where when a operational mode is set to "meeting", calls may be diverted to voice-mail. Or, when the operational mode is set to "outdoors", calls may be diverted to a secretary. Further, the present invention of sending profile information to a network may allow the invention to be used as a working-hour tracker where workmen would not need a separate time card to punch in/out on; they could simply change their operational mode to reflect their current status. Moreover, the present invention may be used in task-allocation applications where people working on a task may change their operational mode when they are finished with a task and ready for the next task. For example, they may set the operational mode to any of "busy", "free", "break", etc.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular networks, materials, and embodiments, the present invention is not intended to be limited to the particulars disclosed herein, rather, the present invention extends to all functionally equivalent structures, methods and uses, such as are within the scope of the appended claims.

What is claimed is:

1. A method for making profile information of a wireless terminal in a network accessible to the network, said method comprising:

determining a current operational mode of the wireless terminal, the current operational mode identified by an operational mode name;

determining a wireless terminal identification for the wireless terminal; and sending stored profile information of the wireless terminal from the wireless terminal to the network, the profile information including the operational mode name and the wireless terminal identification, the sent profile information being accessible from the network by at least two other wireless terminals of a plurality of wireless terminals.

2. The method according to claim 1, the wireless terminal identification being used to identify at least one of the wireless terminal and a user of the wireless terminal.

3. The method according to claim 1, wherein the profile information is used to update stored user data, the stored user data including at least one of user identification, wireless terminal information, and operational mode name, the stored user data of each user being stored on the network.

4. The method according to claim 1, wherein the profile information is sent automatically to the network if the operational mode has changed.

5. The method according to claim 1, further comprising storing the sent profile information on the network.

6. The method according to claim 5, the storing performed by a network application, the network application comprising a virtual whiteboard application having access to the network, the profile information stored by the virtual whiteboard application being accessible and viewable from a virtual whiteboard.

7. The method according to claim 6, wherein the virtual whiteboard is accessible and viewable by each user.

8. The method according to claim 6, wherein the virtual whiteboard is accessible and viewable by people other than users.

9. The method according to claim 5, wherein a parameter in the current operational mode is settable that prohibits the profile information stored on the network application from being any of accessed and viewed.

10. The method according to claim 1, the network comprising a Wireless Local Area Network (WLAN).

11. The method according to claim 5, the profile information stored in a database.

12. The method according to claim 1, the wireless terminal communicating with the network using a transport interface.

13. The method according to claim 12, the transport interface comprising a Wireless Application Protocol (WAP) interface.

14. The method according to claim 12, the transport interface comprising a TCP/IP (Transmission Control Protocol/Internet Protocol) interface.

15. The method according to claim 12, the transport interface comprising a Short Message Service (SMS) interface.

16. The method according to claim 12, the transport interface comprising an E-mail interface.

17. The method according to claim 1, the wireless terminal using the Internet to send the profile information to the network.

18. The method according to claim 3, comprising searching the stored user data for desired information using search criteria.

19. A system for making profile information of a wireless terminal in a network accessible to the network, said system comprising:

a network;

a plurality of wireless terminals, at least one of the plurality of wireless terminals being associated with one of a plurality of users, the plurality of wireless terminals being operably connected to the network;

at least one transport interface, the at least one transport interface allowing communication between the plurality of wireless terminals and the network, each plurality of wireless terminals sending its profile information to the network using the transport interface; and a network application, the network application receiving and storing the profile information for each plurality of wireless terminals, the stored profile information being accessible from the network by at least two other wireless terminals of the plurality of wireless terminals.

20. The system according to claim 19, wherein the plurality of wireless terminals comprises at least one of wireless phones, portable computers, Smart Phones, and wireless Personal Communicators.

21. The system according to claim 19, the network application storing the profile information in a database.

22. The system according to claim 19, the network application including a user interface.

23. The system according to claim 22, the user interface comprising a graphical user interface.

24. The system according to claim 19, the transport interface comprising a Wireless Application Protocol (WAP) interface.

25. The system according to claim 19, the transport interface comprising a TCP/IP (Transmission Control Protocol/Internet Protocol) interface.

26. The system according to claim 19, the transport interface comprising a Short Message Service (SMS) interface.

27. The system according to claim 19, the transport interface comprising an E-mail interface.

28. The system according to claim 19, the network comprising a Wireless Local Area Network (WLAN).

29. The system according to claim 28, the plurality of wireless terminals connected to the WLAN through access points connected to the WLAN.

30. The system according to claim 19, the network accessible to the wireless terminals using the Internet.

* * * * *